(12) United States Patent
Guenter et al.

(10) Patent No.: US 12,143,045 B2
(45) Date of Patent: Nov. 12, 2024

(54) TECHNIQUE FOR DISCONNECTING THE ACTUATION OF A POWER STAGE

(71) Applicant: Phoenix Contact GmbH & Co. KG, Blomberg (DE)

(72) Inventors: Alexander Guenter, Barntrup (DE); Dirk Plewka, Nieheim (DE); Lutz Heuer, Blomberg (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 133 days.

(21) Appl. No.: 18/014,761

(22) PCT Filed: Jul. 7, 2021

(86) PCT No.: PCT/EP2021/068825
§ 371 (c)(1),
(2) Date: Jan. 6, 2023

(87) PCT Pub. No.: WO2022/008590
PCT Pub. Date: Jan. 13, 2022

(65) Prior Publication Data
US 2023/0299706 A1 Sep. 21, 2023

(30) Foreign Application Priority Data
Jul. 8, 2020 (BE) .................................. 2020/5507

(51) Int. Cl.
*H02P 29/024* (2016.01)
*H02P 27/06* (2006.01)
(52) U.S. Cl.
CPC ............ *H02P 29/024* (2013.01); *H02P 27/06* (2013.01)

(58) Field of Classification Search
CPC ............... H02M 7/5387; H02M 5/272; H02M 2001/32; H02P 29/024; H02P 27/06;
(Continued)

(56) References Cited

U.S. PATENT DOCUMENTS

2002/0084766 A1 7/2002 Schwesig
2018/0358910 A1 12/2018 Mayr

FOREIGN PATENT DOCUMENTS

DE          10059173 C1    3/2002
DE        102011003922 A1  8/2012
(Continued)

OTHER PUBLICATIONS

Kiuchi, Tadaaki et. al, Power Converter, Mar. 6, 2015, Clarivate Analytics, pp. 1-37. (Year: 2015).*

*Primary Examiner* — Antony M Paul
(74) *Attorney, Agent, or Firm* — LEYDIG, VOIT & MAYER, LTD.

(57) ABSTRACT

A device for disconnecting an actuation of a power stage of an electric machine includes: a first input for detecting a safety function signal and a second input for detecting a reference potential of the safety function signal; and at least one switch-off path of the actuation, each of the at least one switch-off path including: an input coupler connected between the first input and the second input on an input side for transmitting the safety function signal from the first and second inputs; and at least one output for actuating a switch of a half bridge of the power stage, and at least one modulation logic unit for logically linking a modulation signal associated with a respective switch and the safety function signal transmitted by a respective input coupler and to output it at the output as a disconnectable modulation signal.

20 Claims, 7 Drawing Sheets

(58) Field of Classification Search
CPC .. H02P 27/08; H02P 7/292; H02P 7/29; H02P 23/28; H02P 29/032; H02P 2201/05; H02P 2207/01; H02P 2207/05; H02P 29/00; H02P 7/04; H02P 3/06; H02P 29/025; H02P 27/00
See application file for complete search history.

(56) References Cited

FOREIGN PATENT DOCUMENTS

| | | | |
|---|---|---|---|
| DE | 102015120023 A1 | 5/2017 | |
| EP | 3166218 A1 | 5/2017 | |
| EP | 3166218 B1 * | 12/2021 | ............. H02H 3/044 |

* cited by examiner

TECHNIQUE FOR DISCONNECTING THE ACTUATION OF A POWER STAGE

CROSS-REFERENCE TO PRIOR APPLICATIONS

This application is a U.S. National Phase application under 35 U.S.C. § 371 of International Application No. PCT/EP2021/068825, filed on Jul. 7, 2021, and claims benefit to Belgian Patent Application No. BE 2020/5507, filed on Jul. 8, 2020. The International Application was published in German on Jan. 13, 2022 as WO/2022/008590 under PCT Article 21(2).

FIELD

The invention relates to a technique for disconnecting the actuation of a power stage of an electric machine. In particular, but not limited thereto, a device for disconnecting a power stage and a frequency converter equipped therewith are disclosed.

BACKGROUND

Frequency converters having a function for safe torque interruption, technically known as "Safe Torque Off" function (STO function), already exist for driving an electric motor. The document DE 10 2011 003 922 A1 describes such a frequency converter, the STO input signal of which is dynamized, i.e. time dependent. A supply voltage generation unit eliminates a DC voltage component. A supply voltage for transmission means and drivers for actuation of a power stage is only generated when a time-dependent signal is present. In the event of a dynamization failure, the supply voltage is automatically interrupted in accordance with the fail-safe principle.

However, this principle requires that the dynamic signal be generated. This can be achieved, for example, by a microcontroller or by a different type of clock generator. In addition, the dynamic signal has to be evaluated by a processing unit.

While such a design can be implemented with justifiable additional effort, for frequency converters that require a microcontroller for further functions the use of a microcontroller or other complex circuits exclusively for dynamization is unreasonable, for example for simple variable speed starters. In particular, no STO function is yet known for simple variable speed starters.

SUMMARY

In an embodiment, the present invention provides a device for disconnecting an actuation of a power stage of an electric machine, comprising: a first input configured to detect a safety function signal and a second input configured to detect a reference potential of the safety function signal; and at least one switch-off path of the actuation, each of the at least one switch-off path comprising: an input coupler connected between the first input and the second input on an input side and configured to transmit the safety function signal from the first and second inputs; and at least one output configured to actuate a switch of a half bridge of the power stage, and at least one modulation logic unit configured to logically link a modulation signal associated with a respective switch and the safety function signal transmitted by a respective input coupler and to output it at the output as a disconnectable modulation signal, wherein the input coupler is configured to transmit the safety function signal galvanically isolated from the first and second inputs, and/or wherein the modulation signal associated with the respective switch is galvanically isolated from a modulator configured to generate the modulation signal in the device.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
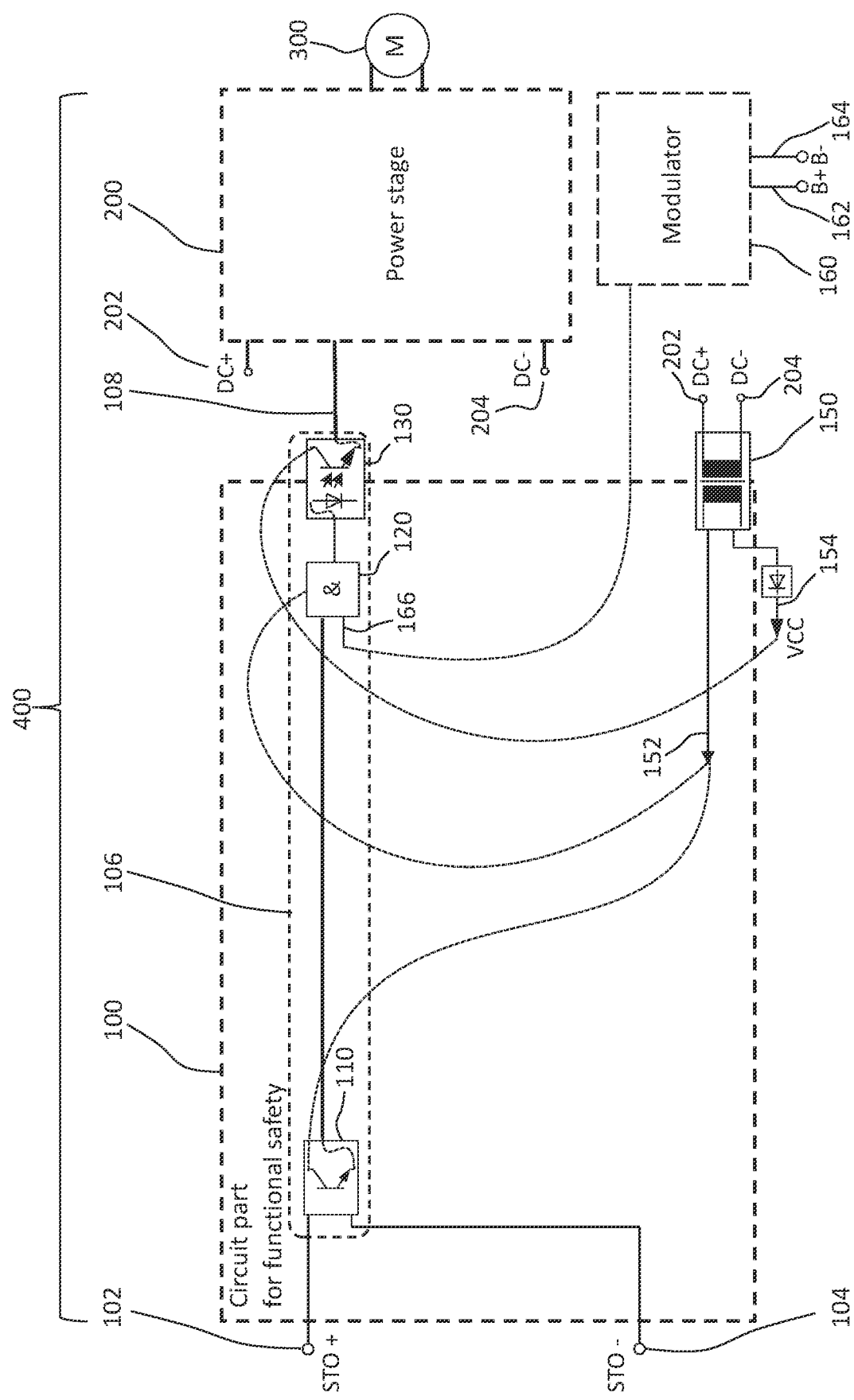
FIG. 1 shows a schematic block diagram of a device for disconnecting the actuation of a power stage and of a corresponding frequency converter according to a first embodiment.

In an embodiment, the present invention provides a technique for safely disconnecting the actuation of a power stage, in particular of an STO function, which does not require any complex dynamization of the input signal, and which can preferably also be integrated into a simple variable speed starter.

In the following, embodiments of the invention are described with partial reference to the figures.

A first aspect relates to a device for disconnecting the actuation of a power stage of an electric machine. The device comprises a first input for detecting or connecting a safety function signal and a second input for detecting or connecting a reference potential of the safety function signal. Furthermore, the device comprises one or at least two actuation switch-off paths (or switch-off paths for the actuation). Each switch-off path (or shutdown path) in each case comprises:

an input coupler connected between the first input and the second input on the input side and designed to transmit the safety function signal (optionally galvanically isolated) from the inputs;

at least one output for actuating a switch of a half bridge of the power stage; and at least one modulation logic unit which is designed to logically link a modulation signal associated with the respective switch and the safety function signal transmitted by the respective input coupler and to output it at the output as a modulation signal which can be disconnected.

The input coupler transmits the safety function signal galvanically isolated from the inputs. Alternatively or additionally, the modulation signal associated with the respective switch is galvanically isolated (optionally in the device) from a modulator for generating the modulation signal.

The modulation signal which can be disconnected may also be referred to as a safe modulation signal.

The modulation logic unit may be a logical operator. Alternatively or additionally, the modulation logic unit may be a logic unit which is designed to logically link a modulation signal that is associated with the respective switch and generated by a modulator and the safety function signal transmitted by the respective input coupler and to output it at the output as the modulation signal which can be disconnected.

The switch of a half bridge may be a semiconductor switch.

The device may be a functional safety circuit part for or in a frequency converter.

The electric machine may be an electric motor.

Embodiments of the device may set the condition that the power stage can only be actuated by means of the modulation logic unit when the safety function signal is applied at the first input and/or at the second input. If the safety function signal ceases to be present at the first input and/or at the second input, the or each modulation logic unit does not output the modulation signal associated with the respective switch of a half bridge to the power stage, since the transmitted safety function signal ceased to be present (i.e. it is not applied or is logically equal to zero), i.e. the power stage is not actuated.

In the same embodiments or further embodiments, the or each switch-off path may each be designed (for example independently of the or the other switch-off path(s)) to monitor the safety function signal between the inputs (for example to detect it by means of the respective input coupler) and to terminate (for example by means of the modulation logic unit) the actuation of the power stage in response to the safety function signal ceasing to be present.

The safety function signal may have ceased to be present at the inputs if the first input or the second input is interrupted or free of potential. The safety function signal may be applied (for example applied only) if a current flows from the first input to the second input. A current representing the safety function signal may flow from the first input through the or each input coupler to the second input.

The input coupler may be designed to transmit the safety function signal that is represented by a current flowing between the first input and the second input or by a voltage applied between the first input and the second input.

The logic link may be a logical AND operation (or conjunction) between the associated modulation signal and the transmitted safety function signal.

Due to the AND operation, a (preferably positive) transmitted safety function signal may be a prerequisite for forwarding or transmitting or outputting the associated modulation signal to the power stage.

The reference potential of the safety function signal may be an earth potential or a ground potential.

The device may be designed to enable the actuation of N half bridges (for example for N phases) of the power stage. The device may comprise at least 2N outputs. One pair of outputs may in each case be associated with each half bridge. Each pair of outputs may be designed to actuate switches (preferably semiconductor switches, for example a high-side semiconductor switch and a low-side semiconductor switch) of the power stage, which are associated with the respective half bridge.

The device may comprise at least two switch-off paths, the input couplers of which are connected in series between the first input and the second input.

The safety function signal may be a signal for the safe torque interruption (in short: STO signal) of the electric machine. The STO signal and/or the device may be designed in accordance with the European Standard IEC 61800-5-2: 2007 and/or the stop category 0 or 1 of the European Standard 60204.

The electric machine may be used or is usable as motor and/or as generator. The disconnecting may interrupt a drive torque (for example in the case of the motor) and/or interrupt a braking torque (for example in the generator).

The electric machine may be an electric motor, preferably an asynchronous motor. Alternatively or additionally, the electric machine may be a three-phase machine.

The device may further comprise a converter or transformer configured to output or provide a supply voltage to the input coupler and/or to the modulation logic unit and/or to the output (for example the optocoupler of the output), with the supply voltage being galvanically decoupled from a control unit for monitoring the disconnecting and/or a modulator for generating the modulation signal.

The safety function signal or the first input may feed (for example, provide) a supply voltage of the input coupler or of the input couplers and/or a supply voltage of the modulation logic unit or of the modulation logic units.

Alternatively or additionally, a supply voltage of the input coupler or of each input coupler and/or a supply voltage of the modulation logic unit or of each modulation logic unit may be output or provided independently of the safety function signal (for example, independently of the application or absence of the safety function signal). Alternatively or additionally, a supply voltage of the input coupler or of each input coupler and/or a supply voltage of the modulation logic unit or of each modulation logic unit may be galvanically decoupled from an operating voltage of a modulator generating the modulation signal and/or an output coupler (for example an optocoupler) outputting the modulation signal, which can be disconnected, at the output.

The or each galvanically isolating input coupler of the safety function signal and/or the galvanic isolation of the modulation signal may have an optical, inductive and/or capacitive signal coupling.

The or each switch-off path may further comprise a filter. The filter may be connected between the input coupler and the modulation logic unit. The filter may comprise an amplifier. The amplifier may amplify the safety function signal that has been transmitted galvanically isolated, for example to a voltage for actuating the power stage and/or to a voltage of more than 100 V or more than 200 V. Alternatively or additionally, the filter may comprise a low-pass. The low-pass may filter the amplified safety function signal. Alternatively or additionally, the filter may comprise a Schmitt trigger. The Schmitt trigger may output the amplified and/or filtered safety function signal with a hysteretic signal course, for example to the modulation logic unit.

A time constant (for example, a time characteristic or filter length) of the low-pass may be independent of a voltage of the safety function signal.

The or each switch-off path may further comprise a test logic unit. The test logic unit may be connected between the input coupler and the modulation logic unit. The test logic unit may logically link the transmitted safety function signal and a test signal on the input side (for example, according to an AND operation).

The device may further comprise a control unit designed to generate the test signal for interrupting the transmitted safety function signal (for example, a logical zero) and, in response to the test signal, to monitor a signal curve (or course) at a signal pickoff at the modulation logic unit or at the output. The control unit may, for example, be designed to output an instruction to a modulator generating the modulation signal to switch off the modulation signal if the monitored signal curve does not correspond to the disconnecting of the actuation within a predetermined time window.

The device may further comprise a modulator switch-off path. The modulator switch-off path or the device may comprise a modulator generating the modulation signal. The modulator switch-off path may further comprise an input coupler connected between the first input and the second input on the input side and designed to transmit the safety function signal galvanically isolated from the inputs to the modulator as a (for example logically inverted) switch-off instruction. The modulator may be designed to switch off the modulation signal in response to the transmitted safety function signal ceasing to be present.

The device may further comprise a modulator designed to generate the at least one modulation signal. The transmitted safety function signal may be applied to the modular in a separate switch-off path (the modulator switch-off path). The modulator may be designed to interrupt (i.e. switch off) the generation of the at least one modulation signal in response to the transmitted safety function signal ceasing to be present (i.e. being absent).

The device may further comprise a control unit switch-off path. The control unit switch-off path or the device may comprise a control unit. The control unit switch-off path may further comprise an input coupler which is connected on the input side, for example, between the first input and the second input, and is designed to transmit the safety function signal galvanically isolated from the inputs to the control unit. The control unit may be designed to monitor a signal curve at a signal pickoff at the modulation logic unit or at the output in response to the transmitted safety function signal ceasing to be present. The control unit may, for example, further be designed to output an instruction to a modulator generating the modulation signal to switch off the modulation signal if the monitored signal curve does not correspond to the disconnecting of the actuation within a predetermined time window.

The device may further comprise a holding switch-off path (also: brake switch-off path). The holding switch-off path may comprise an electromechanical brake or twistlock and an input coupler which is connected between the first input and the second input on the input side and is designed to transmit the safety function signal galvanically isolated from the first input and from the second input to the electromechanical brake or twistlock. The electromechanical brake may be designed to generate a braking torque on a shaft of the electric machine when the transmitted safety function signal ceases to be present, or the electromechanical twistlock may be designed to generate a holding torque on a shaft of the electric machine when the transmitted safety function signal ceases to be present.

A second aspect relates to a frequency converter for driving an electric motor. The frequency converter comprises a power stage which is designed to switch or to generate at least one phase of the electric motor (for example, switch of a half bridge of the power stage) in accordance with at least one modulation signal which can be disconnected. The frequency converter further comprises a modulator which is designed to generate at least one modulation signal for actuating the power stage. The frequency converter further comprises a device for disconnecting the actuation of the power stage according to the first aspect.

According to the first aspect, the device may be designed to logically link the at least one modulation signal of the modulator to the transmitted safety function signal, respectively, to output the modulation signal which can be disconnected.

As used herein, the term frequency converter also includes an inverter with a variable frequency (for example, in accordance with the at least one modulation signal). Depending on the number of phases switched by the power stage, the inverter may thereby be a single-phase, two-phase, three-phase or multi-phase inverter.

The frequency inverter may be operated with DC voltage or AC voltage. For example, a DC voltage as supply voltage may be applied or may be capable of being applied to the power stage on the input side. Alternatively or additionally, the frequency converter may comprise a rectifier (for example a DC link with rectifier), to which an AC voltage as supply voltage is applied or may be applied on the input side. On the output side, the rectifier (or the DC link) may be electrically connected to the input of the power stage.

The frequency converter may be a variable speed starter or may be integrated into a variable speed starter. The control unit may further be designed to control the modulator according to a starting procedure of the electric motor and/or to control the modulator to reverse the electric motor.

FIG. 1 shows a schematic block diagram of a first embodiment of a device which is generally identified with reference numeral 100 for disconnecting the actuation of a power stage which is generally identified with reference symbol 200. The power stage 200 may be designed or usable to drive or draw current from an electric machine which is generally identified with reference symbol 300, i.e. an electric motor or an electric generator, respectively.

The first embodiment of the device 100 comprises a first input 102 for detecting a safety function signal and a second input 104 for detecting a reference potential of the safety function signal. In the case of the first embodiment, the device 100 further comprises an actuation switch-off path 106. Other embodiments may comprise two or more switch-off paths 106.

Each switch-off path 106 comprises a respective input coupler 110. On the input side, the input coupler 110 is connected between the first input 102 and the second input 104. The input coupler 110 is designed to transmit the safety function signal (optionally galvanically isolated in a first variation of each embodiment) from the first input 102 and from the second input 104.

Each switch-off path 106 further comprises at least one respective output 130 for actuating a switch of a half bridge of the power stage 200 (for example, a phase of the power stage 200), each preferably for actuating a positive or negative section of the phase and/or of a semiconductor switch (for example, of an IGBT) on the high-side branch or on the low-side branch of the power stage 200.

Each switch-off path 106 further comprises a respective modulation logic unit 120 which is designed to logically link a modulation signal 166 associated with the respective switch (for example the positive or negative section of the phase) and the safety function signal transmitted by the respective input coupler 110 and to output it at the output as a modulation signal 108, which can be disconnected. Preferably, the modulation signal has two logic levels and/or corresponds to pulse-width modulation (PWM).

The symbol of the input coupler 110 shown in FIG. 1 generally represents a galvanically isolating or non-galvanically isolating input coupler 110. For example, the input coupler 110 may be configured as shown schematically below in one of FIGS. 3A to 3D.

In the first variation, the input coupler 110 may galvanically isolate the safety function signal from the respective switch-off path 106, for example as shown schematically below in FIG. 3A. In a second variation, the modulation signal 166 may alternatively or additionally be galvanically isolated from an external modulator 160, for example according to FIG. 3A. Thus, in any variation, the inputs 102 and 104 of the safety function signal may be protected from a dangerous touch voltage (even in the event of a malfunction of one of the components of the respective switch-off path 106 or of the external modulator 160). If the input coupler 110 is not galvanically isolating, for example as shown below in one of FIGS. 3B to 3D, the modulation signal 166 must be galvanically isolated, since for electrical safety either the input coupler 110 or the connection of the external modulator 160 must be a galvanically isolating component (e.g. an optocoupler).

If the safety function signal ceases to be present, a supply voltage of the input coupler 110 and/or of the modulation logic unit 120 is preferably not controlled or not interrupted. Alternatively or additionally, the failure of the supply voltage in each switch-off path 106 may have the same effect as when the transmitted safety function signal ceases to be present, i.e. the actuation is disconnected in the event of a failure of the supply voltage.

In any embodiment, the one or the at least two switch-off paths 106 may implement a safe torque interruption (i.e., a "safe torque off" or STO function).

In any embodiment, the output 130 may comprise an output coupler for galvanically isolated transmission of the modulation signal 108 which can be disconnected to the power stage 200. The output coupler may comprise an optocoupler (i.e. optical signal coupling) or on inductive and/or capacitive signal coupling.

While the first embodiment comprises one switch-off path 106, further embodiments may comprise two or more switch-off paths 106, for example as a further development of the first embodiment.

In a further embodiment, the device 100 for actuating a power stage 300 may comprise two switch-off paths 106 for single-phase alternating current for the upper (technically also: "high-side") or lower (technically also: "low-side") branch, respectively, of a half bridge. Optionally, a third switch-off path may be provided for a microcontroller monitoring or testing the device.

In yet another embodiment, the device 100 for actuating a power stage 300 may comprise six switch-off paths 106 for three-phase current for the upper (technically also: "high-side") or lower (technically also: "low-side") branch, respectively, of three half bridges each (technically also: B6 bridges). Optionally, a seventh switch-off path may be provided for a microcontroller monitoring or testing the device.

In any embodiment, one or at least two separate switch-off paths 106 may be provided to implement an STO function, for example in a variable speed starter of the electric motor 300.

An "STO+" signal (for example having a nominal voltage of 24 V) may be detected at and/or connected to the first input 102. An associated reference potential, i.e. an "STO−" signal (for example having a nominal voltage of 0 V) may be detected at and/or connected to the second input 104. If one of the two signals ceases to be present (for example, in that the corresponding input becomes potential-free or an electrical connection of the corresponding input becomes highly resistive), the transmitted safety function signal ceases to be present in each switch-off path, i.e. the safety function is triggered.

In a first variation of each embodiment, these two signals STO+ and STO−, in the input coupler 110 are each galvanically isolated from the respective switch-off path 106 by means of an optocoupler 110. The switch-off path(s) 106 may also be referred to as channel or channels, respectively.

The power stage 200 will be fed by a positive terminal 202 (DC+) and a negative terminal 204 (DC−) of a DC voltage (for example a DC mains or a rectified voltage). The power stage switches the DC voltage in accordance with the modulation signal 166 to generate the appropriate phase (i.e. associated with the modulation signal 166) for the electric machine 300.

The device 100 may be implemented as a functional safety circuit part, preferably as an STO safety function circuit part.

Further, FIG. 1 shows a schematic block diagram of a first embodiment of a frequency converter which is generally identified with reference symbol 400, for driving an electric motor 300.

The first embodiment of the frequency converter 400 comprises a power stage 200 designed to switch or generate at least one phase of the electric motor 300 in accordance with at least one modulation signal 108 which can be disconnected. To achieve this, the power stage 200 may comprise a semiconductor bridge with two switches each (for example semiconductor switches) for each phase. The frequency converter 400 further comprises a modulator 160 designed to generate at least one modulation signal 166 for actuating the at least one semiconductor bridge (for example, the respective switches of the semiconductor bridge) of the power stage 200. The frequency converter 400 further comprises a device 100 for actuating the actuation of the power stage 200 according to one of the embodiments described herein, wherein the device 100 logically links the at least one modulation signal 166 of the modulator 160 to the transmitted safety function signal, respectively, for outputting the modulation signal 108, which can be disconnected, of the respective phase (for example, of the respective switches of the semiconductor bridge of the power stage 200).

Any embodiment of the device 100 and/or of the frequency converter 400 may comprise a converter or transformer 150 (for example, a DC/DC converter) with galvanic isolation. For example, the transformer 150 comprises a first galvanically decoupled output 152 at which the transformer 150 provides a supply voltage for the device 100, preferably for the input coupler 110 and/or for the modulation logic unit 120 and/or the output 130.

An optional second decoupled output 154 of the transformer 150 provides the supply voltage of the output 130 and/or an operating voltage at the inputs 162 and 164 of the modulator 160 and/or an operating voltage of a control unit (for example, of a microcontroller) of the device 100.

Preferably, the actuation is disconnected exclusively via the switch-off path(s) 106 (or one of the further switch-off paths 107A and/or 107B), while the supply and operating voltages of the other components of the device 100 and/or of the frequency inverter 400 are not controlled, for example not interrupted, when the safety function signal ceases to be present.

Electric drives must fulfil safety functions. Embodiments of the device 100 or of the frequency converter 400 may perform a torque interruption safety function (technically also referred to as "Safe Torque Off" or STO function) in that the power stage is actuated by means of the modulation signal 108 which can be disconnected (for example, with a voltage of 0 V) to immediately interrupt a power supply to the electric motor 300 as drive. The "STO" safety function of the frequency inverter 400 actuating the drive 300 may interrupt the current and thus the torque of the drive.

The drive 300 is no longer able to generate a torque by means of the device 100 or the frequency converter 400, respectively, after the STO has been switched off. When the current is interrupted, a torque of the drive 300 may cease to be present with immediate effect and the drive 300 may be brought to an uncontrolled standstill.

The STO safety function may comply with the stop category 0 of the European standard EN 60204.

Since the drive 300 is no longer able to generate any braking torque electrically when the STO is switched off, separate measures, such as a mechanical brake, are advantageous for braking the drive 300, for example so that no undesired overrun or no overshooting of end positions occurs. When external forces (such as, for example, a lifted mass or spring forces) act, a mechanical brake or a mechanical lock may be designed to generate a braking torque or a holding torque for a shaft of the electric motor 300 in response to the safety function signal ceasing to be present, preferably in order to prevent the change in position that is possible with a torque-free drive 300.

For example, the device 100 may comprise a holding switch-off path. The holding switch-off path comprises an input coupler 110. On the input side, the input coupler 110 is connected between the first input 102 and the second input 104. The input coupler 110 is designed to transmit the safety function signal galvanically isolated from the first input 102 and from the second input 104 to an electromechanical brake or twistlock. If the transmitted safety function signal ceases to be present, the brake generates the braking torque or the twistlock generates the holding torque on a shaft of the electric machine 300.

In any embodiment, the electric machine 300 may be an electric motor. The electric motor 300 may be a three-phase asynchronous motor, for example with a power consumption of 50 W to 3 kW.

Figure 2:
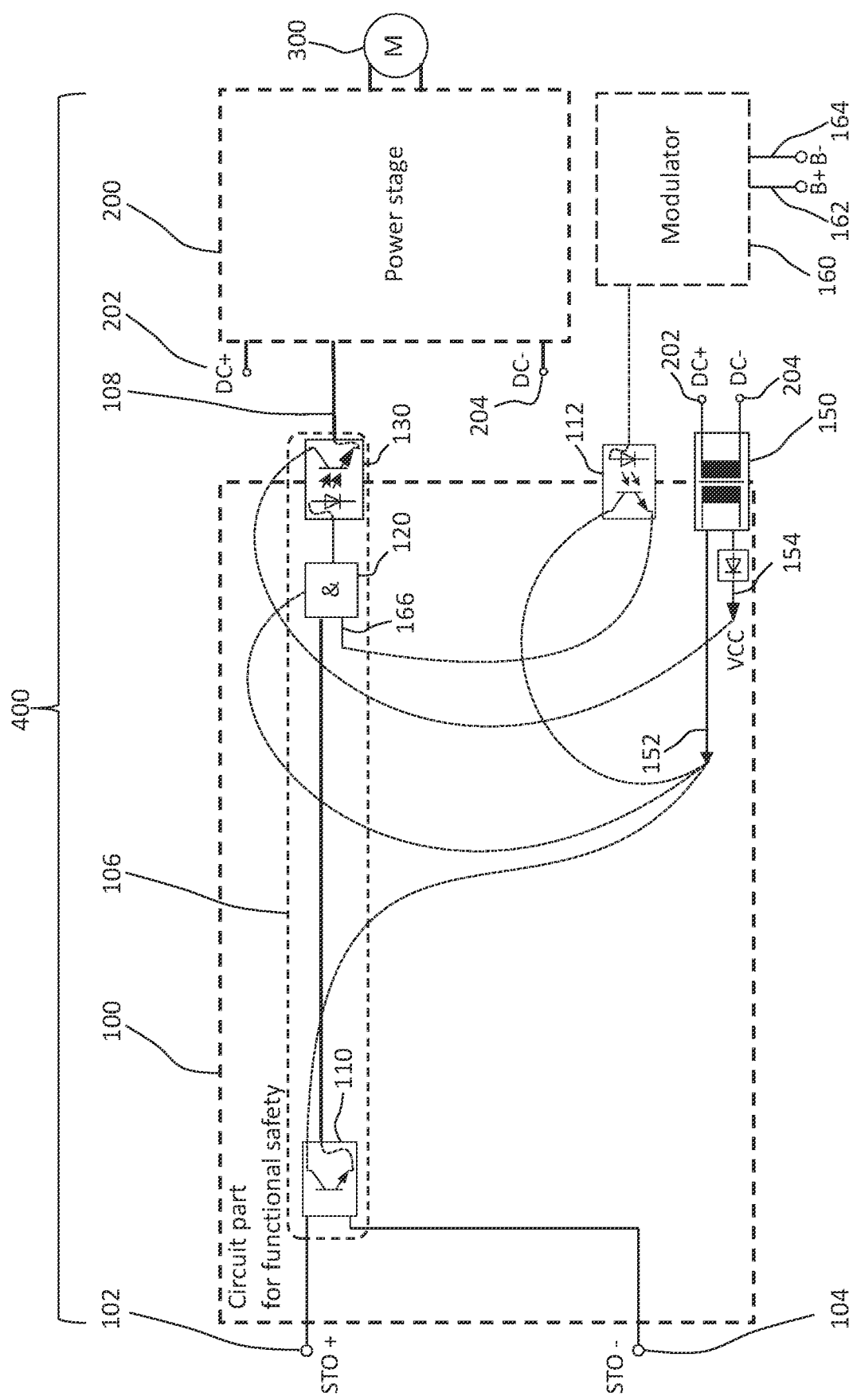
FIG. 2 shows a schematic block diagram of a device for disconnecting the actuation of a power stage and of a corresponding frequency converter according to a second embodiment.

FIG. 2 shows a schematic block diagram of the device 100 and of a corresponding frequency converter according to a second embodiment. The second embodiment may be implemented as such or as a further development of one of the aforementioned embodiments, for example of the first embodiment.

In an optional variation of any embodiment, the input coupler 110 may comprise (at least) one transistor, for example instead of an optocoupler (i.e. the transistor need not be a phototransistor). Thus, the transmitted safety function signal (for example in the device 100) is not galvanically isolated from the safety function signal applied at the first input 102 and/or second input 104.

Alternatively or additionally, a galvanic isolation 112 (for example, an optocoupler or inductive and/or capacitive signal coupling) may galvanically isolate the modulation signal 166 from a modulator 160 that generates the modulation signal (for example, in the device 100 and/or at a modulation signal input of the device 100). This may be necessary to ensure electrical safety.

In any embodiment (for example, where no galvanic isolation is provided at the input coupler 110), the transformer 150 may be required to provide protective isolation (galvanic isolation) or this requirement may be increased (for example, compared to an embodiment with galvanic isolation at the input coupler 110). The transformer 150 may be a component for electrical safety, bypassing the isolation.

FIGS. 3A to 3D in each case shows a schematic block diagram of an example of an input coupler that can be used in any embodiment of the device 100. The schematic block diagrams are simplified or may indicate a circuit principle that can be implemented, for example, by adding more resistors and capacitors or as part of a larger circuit.

While the examples of FIGS. 3A to 3D are described for the input coupler 110 (i.e. the one input coupler 110 or each of the input couplers 110), the example may be used (alternatively or additionally to the input coupler 110) at the output 130 and/or for optional galvanic isolation 112 of the modulation signal 166.

Figure 3A:
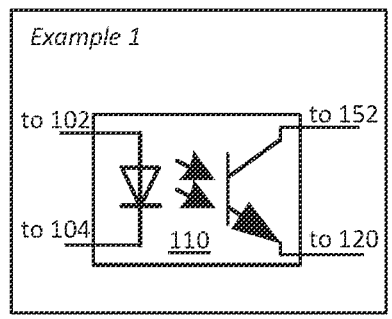
FIGS. 3A to 3D each show a schematic block diagram of an example of an input coupler that can be used for disconnecting in any embodiment of the device.

A first example of the input coupler 110, as shown, for example, in FIG. 3A, comprises an optocoupler for signal coupling. The optocoupler may comprise a light emitting diode connected between the first input 102 and the second input 104 (if necessary in series with further input couplers). The optocoupler may further comprise a phototransistor which can be illuminated by the light emitting diode and the output of which transmits galvanically isolated from the safety function signal on the input side.

Figure 3B:
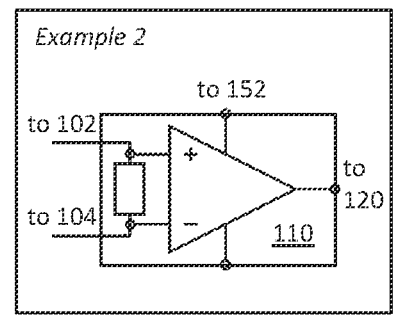

A second example of the input coupler 110, as shown, for example, in FIG. 3B, comprises a differential amplifier for signal coupling. The differential amplifier may be connected in parallel with a resistor connected (if necessary in series with further input couplers 110) between the first input 102 and the second input 104. The differential amplifier may transmit the safety function signal on the output side.

Figure 3C:
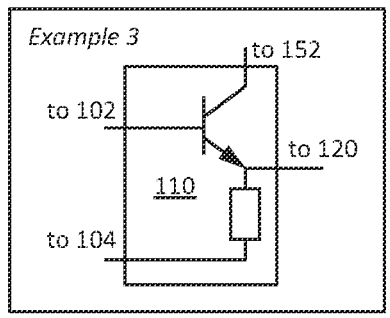

A third example of the input coupler 110, as shown, for example, in FIG. 3C, comprises a transistor (preferably not a phototransistor) for signal coupling. The transistor may be connected between the first input 102 and the second input 104 on the input side (optionally in parallel with a resistor connected as in the second example). The transistor may transmit the safety function signal on the output side.

Figure 3D:
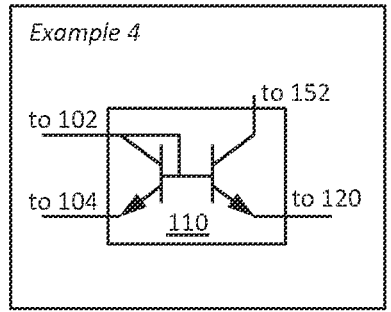

A fourth example of the input coupler 110, as shown, for example, in FIG. 3D, comprises a current mirror for signal coupling. The current mirror may be connected between the first input 102 and the second input 104 on the input side (optionally in parallel with a resistor connected as in the second example). The current mirror may transmit the safety function signal on the output side.

Figure 4:
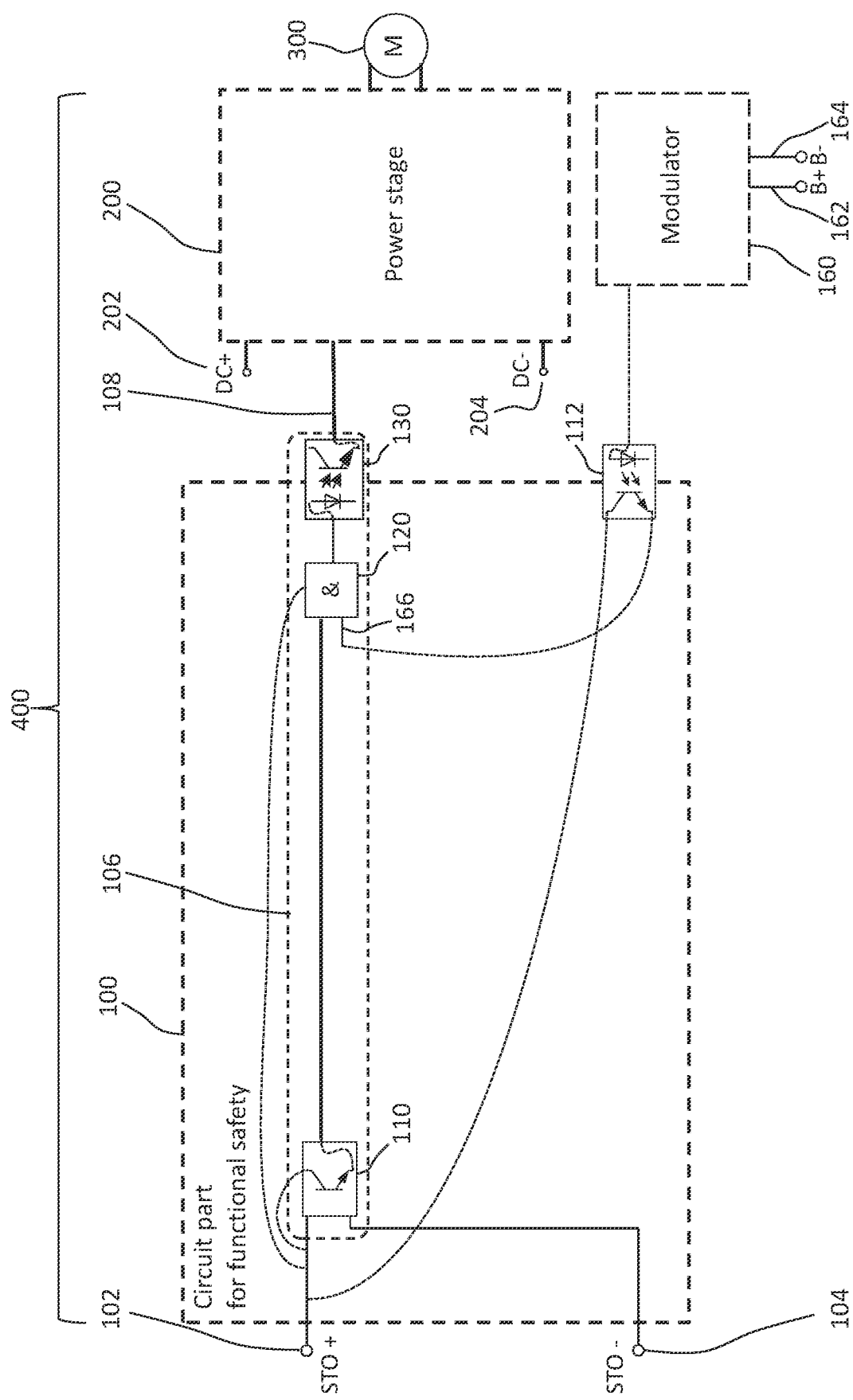
FIG. 4 shows a schematic block diagram of a device for disconnecting the actuation of a power stage and of a corresponding frequency converter according to a third embodiment.

FIG. 4 shows a schematic block diagram of the device 100 and a corresponding frequency converter according to a third embodiment. The third embodiment may be implemented as such or as a further development of one of the aforementioned embodiments, for example of the first and/or second embodiment.

The third embodiment feeds the supply voltage of at least one component or of all components of the respective switch-off path (i.e. channel) 106 or all switch-off paths 106 from the safety function signal, preferably from the first input 102, for example in addition to or instead of a transformer 150. The fed components may comprise the input coupler 110 and/or the modulation logic unit 120.

For example, the channel 106 is supplied from the digital input 102-104 of the safety function signal (STO) and no longer via the transformer 150.

In contrast, an embodiment comprising the transformer 150 may reduce a current consumption at the digital input 102-104.

The output 130 (i.e., the output coupler at the output 130) is preferably not fed from the safety function signal. This is because, for electrical safety, the supply on the output side must not be galvanically connected to the input side.

Figure 5:
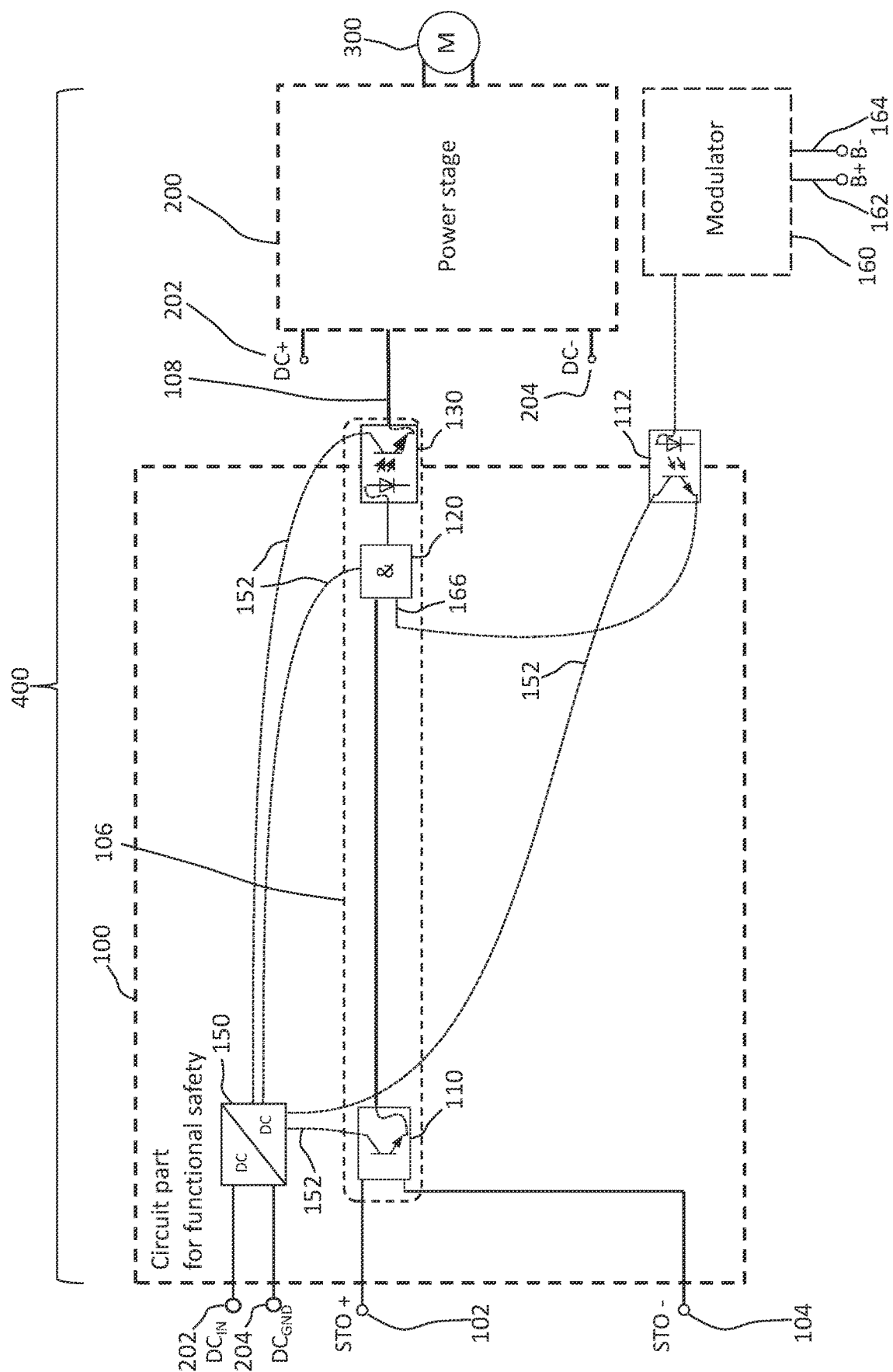
FIG. 5 shows a schematic block diagram of a device for disconnecting the actuation of a power stage and of a corresponding frequency converter according to a fourth embodiment.

FIG. 5 shows a schematic block diagram of the device 100 and of a corresponding frequency converter 400 according to a fourth embodiment. The fourth embodiment may be implemented as such or as a further development of one of the aforementioned embodiments, for example of the first to third embodiment.

The fourth embodiment of the device 100 may comprise, for example in addition to the third embodiment, a (preferably galvanically isolating) converter or transformer 150 (for example a DC/DC converter) for supplying at least one component or all components of the respective switch-off path (i.e. channel) 106 or of all switch-off paths 106. The (preferably galvanically isolating) transformer 150 may be an external supply with respect to the channel 106.

If the converter or transformer 150 does not galvanically isolate its inputs 202 and 204 from an output 152 feeding the components, a supply on the output side must be stopped, i.e. an output coupler (that galvanically isolates the modulation signal 108 which can be disconnected) at the output 130 is no longer fed by means of the transformer 150, because the output 130 must not be galvanically connected to the input side. This means that the corresponding signal line 152 to the output 130 must then be omitted.

Figure 6:
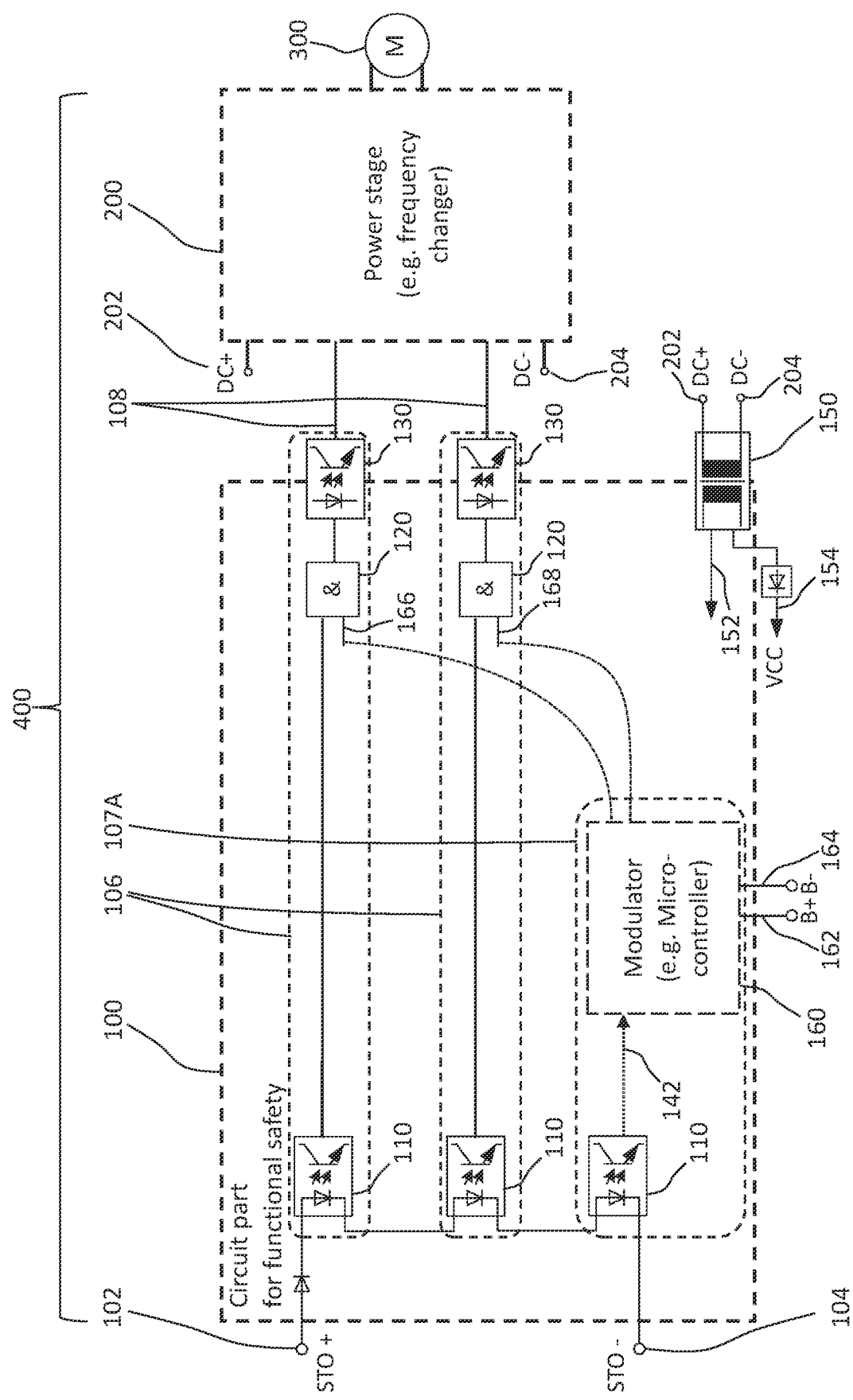
FIG. 6 shows a schematic block diagram of a device for disconnecting the actuation of a power stage and of a corresponding frequency converter according to a fifth embodiment.

FIG. 6 shows a schematic block diagram of the device 100 and of a corresponding frequency converter 400 according to a fifth embodiment. The fifth embodiment may be implemented as such or as a further development of one of the aforementioned embodiments, for example the first to fourth embodiment.

The fifth embodiment comprises at least two switch-off paths 106, for example two switch-off paths for each phase generated by the power stage 200 for driving the electric motor 300 or two switch-off paths for all (for example three) phases generated by the power stage 200 for driving the electric motor 300. As a modulation signal 166 for the at least one modulation logic unit 120 of the first switch-off path 106 (for example, per phase), the modulator 160 generates a pulse-width-modulated signal 166 for generating the phase section of positive voltage (for example, positive with respect to a time-averaged voltage of the respective phase) or for actuating an upper (also: high-side) branch of a half bridge to generate the respective phase in the power stage 200. Further, the modulator 160 generates as the modulation signal 168 of the at least one modulation logic unit 120 of the second switch-off path 106 (for example, per phase) a pulse-width-modulated signal 168 for generating the phase section of negative voltage (for example, with respect to a time-averaged voltage of the respective phase) or for actuating a lower (also: low-side) branch of the half bridge to generate the respective phase in the power stage 200.

In any embodiment, the inputs 102 and/or 104 may be compatible with test pulses from safety switching devices. For example, the test pulses are filtered out, preferably in each switch-off path 106 (and if necessary in each of the further switch-off paths 107A and/or 107B). Embodiments of the device 100 and/or the frequency converter 400 may be designed for both positive and negative test pulses. Preferably, a filter time for filtering out the test pulses is independent of a voltage level at the inputs 102 and/or 104.

Preferably, the device 100 comprises at least one modulator switch-off path 107A. Each modulator switch-off path 107A comprises an input coupler 110. On the input side, the input coupler 110 is connected between the first input 102 and the second input 104, for example in series with the input couplers 110 of the switch-off paths 106. The input coupler 110 of the modulator switch-off path 107A is designed to transmit the safety function signal galvanically isolated from the first input 102 and from the second input 104 to the modulator 160 as a (for example logically inverted) switch-off instruction 142 for switching off the modulation signals 166 and 168. The device 100, for example the modulator switch-off path 107A, may comprise the modulator 160 that is controlled by the transmitted safety function signal.

Figure 7:
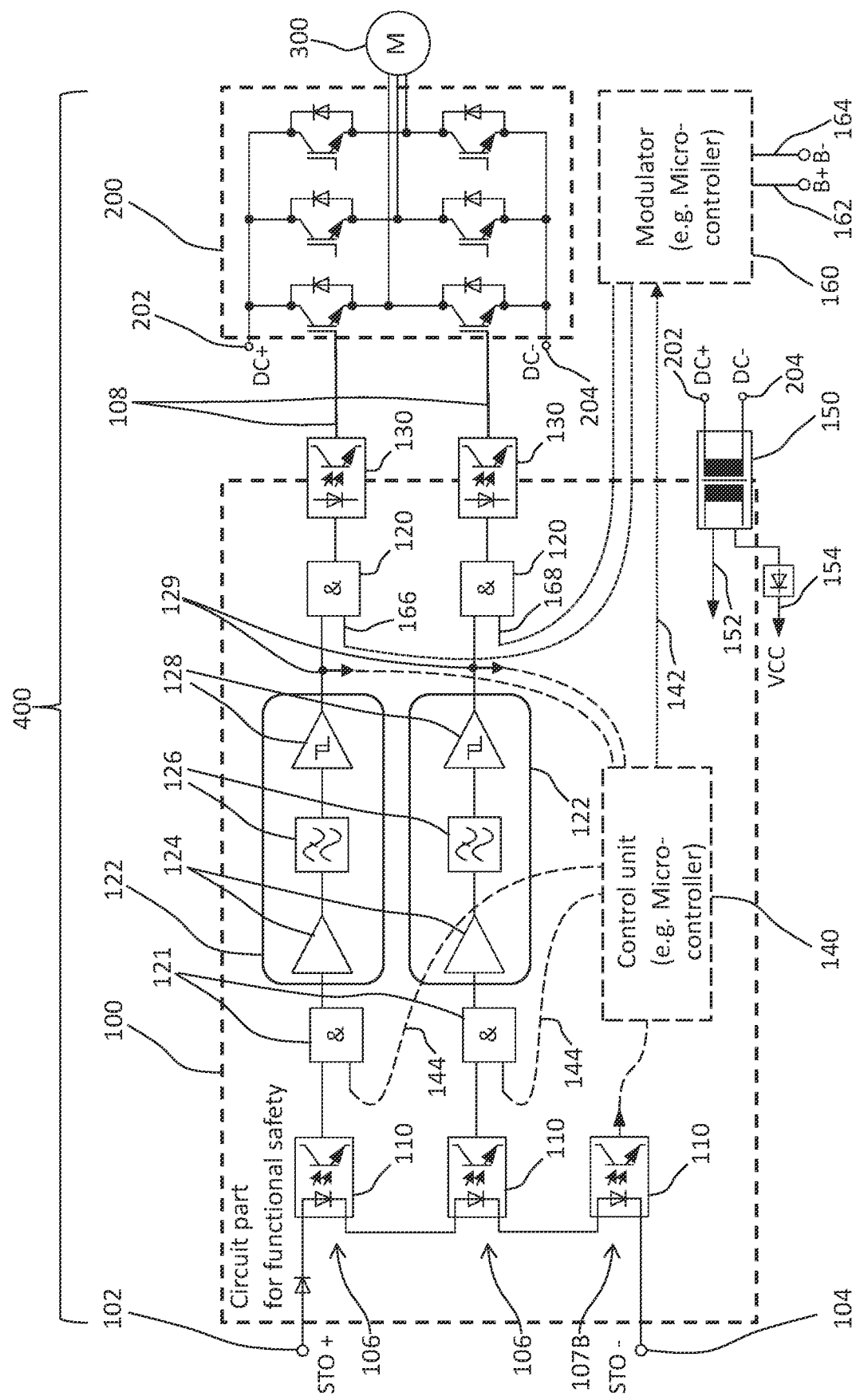
FIG. 7 shows a schematic block diagram of a device for disconnecting the actuation of a power stage and of a corresponding frequency converter according to a sixth embodiment.

FIG. 7 shows a schematic block diagram of the device 100 and of a corresponding frequency converter 400 according to a sixth embodiment. The sixth embodiment may be implemented as such or as a further development of one of the aforementioned embodiments, for example the first to fifth embodiments.

Preferably, each switch-off path 106 comprises a filter 122, for example a low-pass filter 122. Within the respective switch-off path 106, the filter 122 may be connected between the input coupler 110 and the modulation logic unit 120, for example between a test logic unit 121 and the modulation logic unit 120.

Due to the galvanic isolation by means of the respective input coupler 110, it is possible to implement the switch-off path(s) 106 on the potential which is dangerous to touch, of the actuation of the power stage 200. This allows the device 100 to use a microcontroller 140 located on this potential for diagnostic purposes and/or in a microcontroller switch-off path 107B (for example, in a third switch-off path or in a further switch-off path). For example, the transmitted safety function signal within the switch-off path 106 may be represented by a voltage greater than 100 V.

The filter 122 may comprise an amplifier 124 designed to amplify the transmitted safety function signal to the potential of the actuation of the power stage 200.

Alternatively or additionally, the filter 122 may comprise a low-pass 126 and/or a Schmitt trigger 128, preferably an inverting Schmitt trigger 128.

If the safety function signal ceases to be present in the sixth embodiment shown in FIG. 7, a first switch-off path 106 does not transfer a first PWM signal (as a first modulation signal 166) of the modulator 160 (as a high-side driver). A second switch-off path 106 does not transfer a second PWM signals (as a second modulation signal 168) of the modulator 160 (as a low-side driver).

Each embodiment of the device 100 may further comprise a microcontroller switch-off path 107B, for example as a third switch-off path and/or as schematically shown in FIG. 7. The microcontroller switch-off path 107B comprises an input coupler 110. On the input side, the input coupler 110 is connected between the first input 102 and the second input 104, for example in series with the input couplers 110 of the switch-off paths 106 and/or the input coupler 110 of the switch-off path 107A.

The input coupler 110 of the microcontroller switch-off path 107B is designed to transmit the safety function signal galvanically isolated from the first input 102 and the second input 104 to a microcontroller 140 of the switch-off path 107B of the device 100.

The microcontroller 140 may be designed to check whether the modulation signal, which can be disconnected, is actually switched off, for example set to 0 V or DC−, at a signal pickoff at the output 130 of each switch-off path 106, in response to the safety function signal ceasing to be present.

Alternatively or additionally, the microcontroller 140 is designed to output a switch-off instruction 142 for switching off the modulation signal to the modulator 160, for example to transmit a switch-off instruction 142 for switching off the modulation signals 166 and 168 to the modulator 160, in response to the safety function signal ceasing to be present. For example, the microcontroller 140 switches off the PWM signals 166 and 168.

The device 100, for example the modulator switch-off path 107A, may comprise the modulator 160 that is controlled by the transmitted safety function signal. Alternatively or additionally, the modulator 160 may be arranged in the frequency converter 400 outside the device 100.

In any embodiment, in order to ensure the absence of feedback effect of the operational functions for the functional safety (for example, the functions of the device 100), all signals (for example, the transmitted safety function signal and/or the modulation signal 166 or 168 of the modulator 160 and/or the modulation signal 108 which can be disconnected) and/or the supply voltage of the first output 152 of the transformer 150 and/or the operating voltage of the second output 154 of the transformer 150 may be decoupled from each other.

In any embodiment, a test logic unit 121 may be installed as test switch in one or each switch-off path 106 to check the switching capability (for example, of the modulation logic unit 120 and/or of the Schmitt trigger 128) and/or of the timing behaviour of the individual switch-off paths 106 (for example, of a time constant of the filter 122, preferably of the low-pass filter 124).

In each switch-off path 106, a test logic unit 121 may be connected between the input coupler 110 and the modulation logic unit 120, for example between the input coupler 110 and the filter 122. The test logic unit 121 may be designed to logically link the modulation signal transmitted by the input coupler 110 and a test signal 144, for example according to an AND operation, and to output it in the switch-off path 106, for example to the filter 122 or to the modulation logic unit 120.

The device 100 may comprise a control unit 140, for example the aforementioned microcontroller 140, for checking switching capability and/or the timing behaviour.

The control unit 140 may be designed to simulate the ceasing of the present of the safety function signal in the respective switch-off path 106 by means of a test signal 144 (for example, a logical zero). The control unit 140 may further be designed to detect (for example, sense) a voltage curve of the transmitted safety function signal at a signal pickoff 129 in the respective switch-off path 106 between the test logic unit 121 and the modulation logic unit 120. If the transmitted safety function signal ceases to be present at the signal pickoff 129 within a predetermined time window after the test signal 144 has been output to simulate the safety function signal that ceased to be present, the check results in an operating condition of the device 100. Otherwise, the check results in a fault condition. In the fault condition, the control unit 140 may output the fault condition (for example, output visually and/or audibly) and/or output the switch-off instruction 142 to switch off the modulation signal 166 and/or 168 to the modulator 160 (preferably regardless of whether the safety function signal is applied or ceased to be present at the inputs 102 and 104).

Alternatively or additionally, the control unit 140 (for example, the aforementioned microcontroller 140) of the device 100 may be designed to perform at least one of the following control functions. A first control function is the starting of the motor 300, preferably as soft start, with power limitation when the motor 300 is switched on. A second control function is the reversing of the motor 300.

In any embodiment, the modulation logic unit 120 and/or the test logic unit 121 may comprise at least one logic gate (preferably an AND gate) for implementing the respective logic operation (for example, a corresponding Boolean operation).

In the illustration of FIG. 7, only the switch-off paths 106 to two switches of a half bridge of the power stage 200 are shown for better clarity. One output coupler 130 (for example an optocoupler) is required for each switch. For example, a total of six output couplers 130 (for example optocouplers) and six modulation logic units 120 are required in the case of a three-phase asynchronous machine as the electric machine 300 (i.e. three phases, each controlled by a half bridge with two switches). One modulation signal of three modulation signals 166 and three modulation signals 168 is present at each of the six modulation logic units 120. The six output couplers 130 output six modulation signals 108 which can be disconnected.

In a first variation of each embodiment, the AND gates 120 (and thereby output couplers 130) for different switches of the half bridges may be connected to the same input coupler 110 or to the same test logic unit 121 or to the same filter 122. That means that one or each of the switch-off paths 106 may comprise more than one output coupler 130. In a second variation of each embodiment, which may be combined with the first variation for different switch-off paths 106, different switches of the half bridges may be connected to their own respective switch-off paths 106. For example, the device 100 may comprise more than two switch-off paths 106.

The device 100 may be provided or usable as a safety function of the frequency converter 400. Alternatively or additionally, the device 100 may cause a current interruption of the actuation of the frequency converter 400.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SYMBOLS

Device for disconnecting the actuation of a power stage 100
First input of a safety function signal, preferably of an STO signal 102
Second input of a reference potential to the safety function signal 104
Switch-off path 106
Modulator switch-off path 107A
Control unit switch-off path, preferably microcontroller switch-off path 107B
Modulation signal which can be disconnected 108
Input coupler of the safety function signal, preferably galvanically isolating, for example optocoupler, or differential amplifier, for example at voltage divider 110
Galvanic isolation of the modulation signal 112
Modulation logic unit, for example AND gate 120
Test logic unit, for example AND gate 121
Filter, for example low-pass filter 122
Amplifier 124
Low-pass 126
Schmitt trigger, preferably inverting Schmitt trigger 128
Signal pickoff for diagnosis 129
Output of the modulation signal which can be disconnected, preferably galvanically isolating output coupler, for example optocoupler 130
Control unit, for example monitoring the safety function 140
Instruction to switch off the modulation signals 142
Test signal 144
Converter or transformer, preferably decoupling, for example galvanically isolated DC/DC converter 150
First decoupled output of the transformer 152
Second decoupled output of the transformer 154
Modulator, for example microcontroller or clock generator for PWM signal 160
Operating signal input 162
Input of the reference potential to the operating signal 164
First modulation signal, for example PWM signal for positive phase portion and/or for semiconductor switches of a high-side branch 166
Second modulation signal, for example PWM signal for negative phase portion and/or for semiconductor switches of a low-side branch 168
Power stage, for example half bridge, H-bridge or B6-bridge 200
First mains connection, for example positive connection to the DC mains 202
Second mains connection, for example negative connection to the DC mains 204
Electric machine, preferably three-phase asynchronous machine 300

The invention claimed is:

1. A device for disconnecting an actuation of a power stage of an electric machine, comprising:

a first input configured to detect a safety function signal and a second input configured to detect a reference potential of the safety function signal; and
at least one switch-off path of the actuation, each of the at least one switch-off path comprising:
an input coupler connected between the first input and the second input on an input side and configured to transmit the safety function signal from the first and second inputs; and
at least one output configured to actuate a switch of a half bridge of the power stage, and
at least one modulation logic unit configured to logically link a modulation signal associated with a respective switch and the safety function signal transmitted by a respective input coupler and to output it at the output as a disconnectable modulation signal,
wherein the input coupler is configured to transmit the safety function signal galvanically isolated from the first and second inputs, and/or
wherein the modulation signal associated with the respective switch is galvanically isolated from a modulator configured to generate the modulation signal in the device.

2. The device of claim 1, wherein the logic link comprises a logic AND operation between the associated modulation signal and the transmitted safety function signal.

3. The device of claim 1, wherein the device is configured to disconnect actuation of N half bridges of the power stage, wherein the device comprises at least 2·N outputs, and wherein a pair of the outputs is in each case assigned to each half bridge of the power stage.

4. The device of claim 1, wherein the at least one switch-off path comprises at least two switch-off paths, the input couplers of which are connected in series between the first input and the second input.

5. The device of claim 1, wherein the safety function signal comprises a safe torque interruption signal of the electric machine.

6. The device of claim 5, wherein the safe torque interruption (STO) signal of the electric machine is of the European Standard IEC 61800-5-2:2007 and/or of the stop category 0 or 1 of the European Standard 60204.

7. The device of claim 1, wherein the electric machine comprises an electric motor.

8. The device of claim 7, wherein the electric motor comprises an asynchronous motor.

9. The device of claim 1, further comprising:
a transformer configured to output a supply voltage, which is galvanically decoupled from a control unit configured to monitor the disconnecting, or the modulator configured to generate the modulation signal, to the input coupler and/or to the modulation logic unit and/or to the output.

10. The device of claim 1,
wherein the safety function signal or the first input feeds a supply voltage of the input coupler or of the input couplers and/or a supply voltage of the modulation logic unit or of the modulation logic units, or wherein a supply voltage of the input coupler or of the input couplers and/or a supply voltage of the modulation logic unit or of the modulation logic units is output independently of the safety function signal, and/or
wherein a supply voltage of the input coupler or of the input couplers and/or a supply voltage of the modulation logic unit of the modulation logic units is galvanically decoupled from an operating voltage of the modulator configured to generate the modulation signal and/or of an output coupler configured to output the disconnectable modulation signal, at the output.

11. The device of claim 1, wherein each galvanically isolating input coupler of the safety function signal and/or the galvanic isolation of the modulation signal has an optical, inductive, and/or capacitive signal coupling.

12. The device of claim 1, wherein each at least one switch-off path further comprises a filter connected between the input coupler and the modulation logic unit.

13. The device of claim 12, wherein the filter comprises:
an amplifier; and/or
a low-pass; and/or
a Schmitt trigger.

14. The device of claim 1, wherein each at least one switch-off path further comprises a test logic unit connected between the input coupler and the modulation logic unit and which logically links the transmitted safety function signal and a test signal on the input side; and
wherein the device further comprises a control unit configured to generate the test signal for interrupting the transmitted safety function signal and, in response to the test signal, to monitor a signal course at a signal pickoff at the modulation logic unit or at the output.

15. The device of claim 14, wherein the control unit is further configured to output an instruction for switching off the modulation signal to the modulator configured to generate the modulation signal if the monitored signal course does not correspond to disconnecting of the actuation within a predetermined time window.

16. The device of claim 1, further comprising:
a modulator switch-off path,
wherein the modulator switch-off path comprises a or the modulator configured to generate the modulation signal and an input coupler which is connected between the first input and the second input on the input side and is configured to transmit the safety function signal galvanically isolated from the inputs, as a switch-off instruction to the modulator, and
wherein the modulator is configured to switch off the modulation signal in response to the transmitted safety function signal ceasing to be present.

17. The device of claim 1, further comprising:
a control unit switch-off path,
wherein the control unit switch-off path comprises a control unit and an input coupler which is connected between the first input and the second input on the input side and is configured to transmit the safety function signal galvanically isolated from the inputs to the control unit, and
wherein the control unit is configured to monitor a signal course at a signal pickoff at the modulation logic unit or at the output in response to the transmitted safety function signal ceasing to be present.

18. The device of claim 17, wherein the control unit is further configured to output an instruction for switching off the modulation signal to the modulator configured to generate the modulation signal if the monitored signal course does not correspond to disconnecting of the actuation within a predetermined time window.

19. The device of claim 1, further comprising:
a holding switch-off path,
wherein the holding switch-off path comprises an electromechanical brake or twistlock and an input coupler which is connected between the first input and the second input on the input side and is configured to transmit the safety function signal galvanically isolated from the first input and from the second input to the electromechanical brake or twistlock, and
wherein the electromechanical brake is configured to generate a braking torque on a shaft of the electric machine when the transmitted safety function signal ceases to be present, or the electromechanical twistlock is configured to generate a holding torque on a shaft of the electric machine when the transmitted safety function signal ceases to be present.

20. A frequency converter for driving an electric motor, comprising:
a power stage configured to switch at least one phase of the electric motor in accordance with at least one disconnectable modulation signal;
a modulator configured to generate at least one modulation signal for actuating the power stage; and
the device of claim 1, wherein the device logically links the at least one modulation signal of the modulator to a respective transmitted safety function signal to output the disconnectable modulation signal.

* * * * *